United States Patent [19]
Mitsumori et al.
[11] Patent Number: 4,583,926
[45] Date of Patent: Apr. 22, 1986

[54] VANE STRUCTURE FOR VANE TYPE AIR PUMPS

[75] Inventors: Masahito Mitsumori, Tokyo; Kenji Hamabe; Hiroshi Kaneda, both of Saitama, all of Japan

[73] Assignee: Honda Giken Kogyo Kabushiki Kaisha, Tokyo, Japan

[21] Appl. No.: 657,744

[22] Filed: Oct. 4, 1984

[30] Foreign Application Priority Data

Oct. 7, 1983 [JP] Japan ........................... 58-155718[U]
Oct. 7, 1983 [JP] Japan ........................... 58-155719[U]

[51] Int. Cl.⁴ ........................ F04C 18/00; F04C 27/00; F04C 29/00; B32B 5/12

[52] U.S. Cl. ..................................... 418/137; 418/152; 428/113

[58] Field of Search ............... 418/137, 152, 241, 136, 418/138; 428/113

[56] References Cited

U.S. PATENT DOCUMENTS 3,356,292 12/1967 Brewer et al. ........................ 418/137
3,417,664 12/1968 Brucker ............................... 418/152
3,512,908 5/1970 Smith ................................. 418/152
3,791,911 2/1974 Yaeger et al. ........................ 428/113
4,051,289 9/1977 Adamson ............................ 428/113

*Primary Examiner*—John J. Vrablik
*Attorney, Agent, or Firm*—Lyon & Lyon

[57] ABSTRACT

A vane type air pump having vanes with an edge that slidably engages the inside of a cylindrical casing and sides that slidably engage carbon sealing elements. The vanes are constructed of pre-impregnated glass cloth with the warp and weft positioned at acute angles to the sealing element to provide less and smoother wear on the sealing element and inhibit air leakage. A heavy density weave of glass cloth also reduces the wear.

8 Claims, 11 Drawing Figures

VANE STRUCTURE FOR VANE TYPE AIR PUMPS

The present device relates to a vane type air pump and, in particular, to an improved construction of the vane to reduce wear and improve performance.

A typical conventional vane type air pump, such as the pump disclosed in U.S. Pat. No. 3,356,292 for use on automotive engines, is constructed of a cylindrical casing and a cylindrical rotor which has its rotational center line eccentric to the center line of the casing and vanes extending through slots formed in the circumferential wall of the rotor and parallel with the rotational center line. The leading ends of the vanes engage the inner circumference of the casing in a manner to slide in the circumferential direction and there are rod-shaped seal elements on both inner sides of the slots extending longitudinally of the slots to contact both sides of the vanes. Normally the vanes are constructed of a laminate which is made of a multiplicity of layers of pre-impregnated (so-called "prepregs") plain weave glass cloth. The vanes are produced by making its prepreg material of a phenolic resin, such as a thermoset synthetic resin, by laminating ten to twelve sheets of the prepreg, and then heating to set the resin content. The seal elements are usually made of carbon. As a result, when the vanes reciprocally slide radially inward and outward of the rotor relative to the seal elements in accordance with the rotations of the rotor, the phenolic resin of the vanes is worn by the seal elements to expose the glass cloth on the surfaces of the vanes so that the seal members are thereafter worn by the glass cloth.

The afore-described prior art vane construction is shown in FIGS. 7 and 8 and specifically, as shown in FIG. 7, the glass cloth G′ of the vane has its warps w arrayed at a right angle with respect to the longitudinal center line X—X of the seal element 29 and its wefts f arrayed in parallel with the same center line X—X. As a result, as shown in FIG. 8(*a*), the sliding faces of the seal elements 29 are subject to wear by the warps w and the wefts f to provide an undulating section. Further, the weaving density of the glass cloth is relatively low, e.g. 30 to 40 threads per 25 mm for both the warp and the weft whereby the coarse glass cloth is very abrasive on the seal elements. If, moreover, a vane is moved in the direction of the aforementioned center line X—X by a thrust load so that both the lands of the wefts f and the warps w run on the lands of the partially worn seal element 29, there are formed among the recesses of the seal element 29 and the recesses of the warps w and the wefts f spaces S through which air leaks occur to reduce the pumping efficiency.

The present device has an object to provide a vane structure which can eliminate the aforementioned deficiencies and is characterized in that the glass cloth in at least the outer most layer on both sides of each of the vanes has its warps and wefts arrayed at an inclination with respect to the longitudinal center lines of the seal elements. A further object is to reduce the wear imposed on the seal elements by employing a high density weave of glass cloth.

Other and more detailed objects will be apparent from the following description of the present device in connection with preferred embodiment thereof with reference to the accompanying drawings.

FIG. 8(*b*) is a view similar to FIG. 8(*a*) illustrating the typical spaces caused by wear and longitudinal shifting of the vane of the prior art allowing air passage inefficiency.

Figure 1:
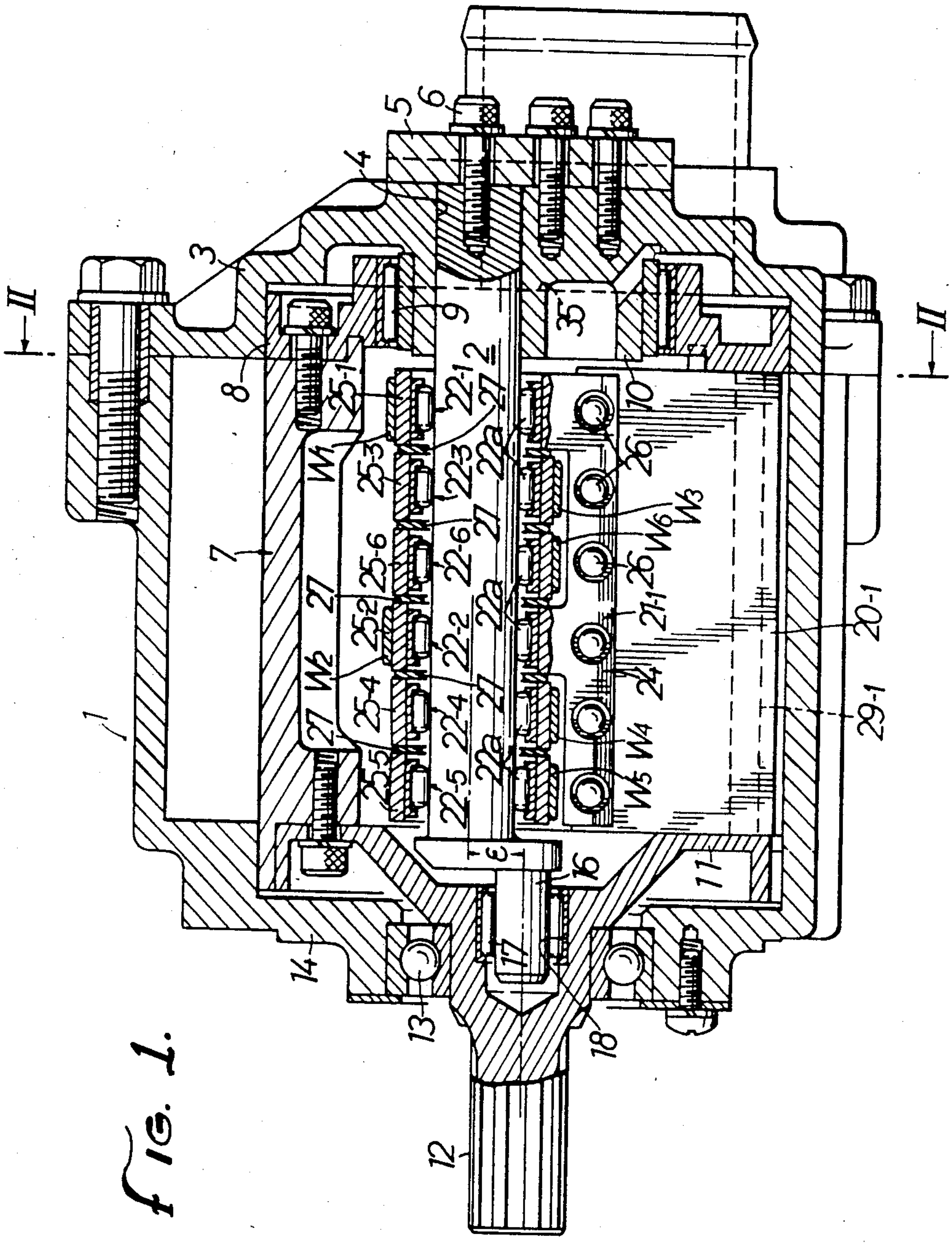
FIG. 1 is a longitudinal sectional side elevation of a vane type air pump in which the improved vane of this invention may be used.
Figure 2:
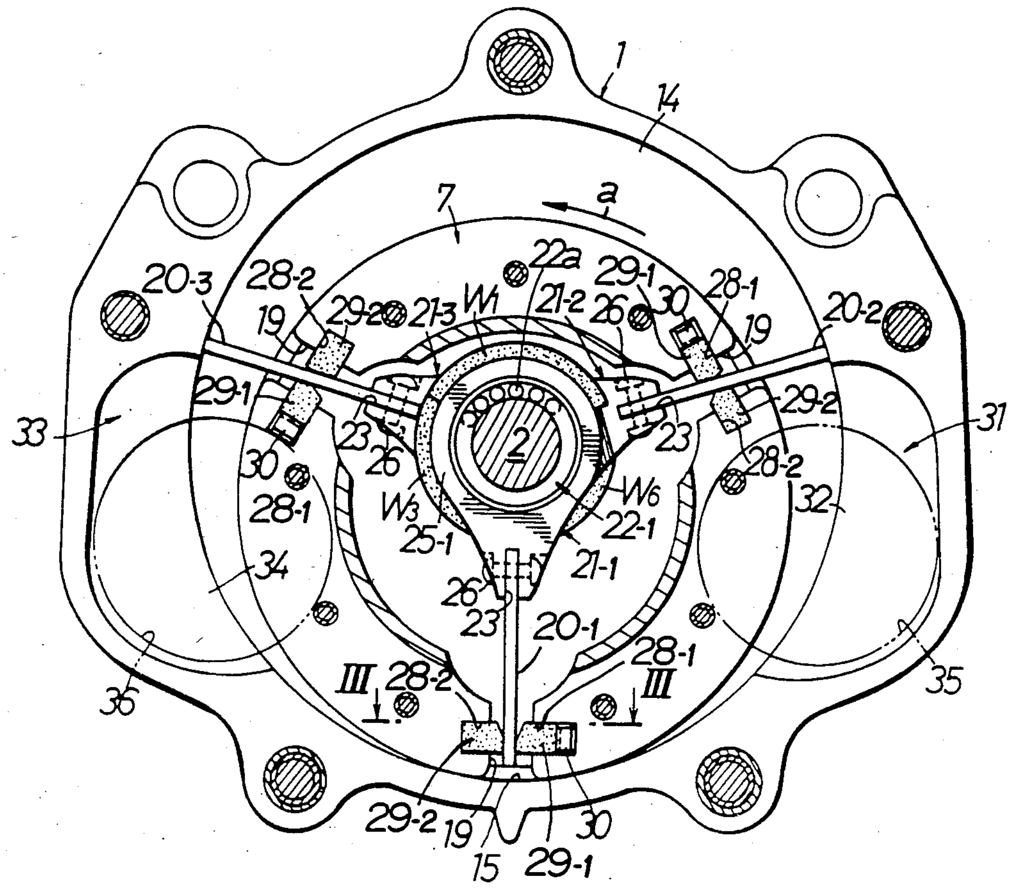
FIG. 2 is a sectional end view of the vane type air pump taken substantially on the line II—II shown in FIG. 1.

As shown in FIGS. 1 and 2, there is arranged in a cylindrical casing 1 a vane shaft 2 which has its axis aligned with the center line of the casing 1. The vane shaft 2 is fitted rotatably and axially immovably in the casing 1 by inserting one end of the shaft 2 in a through hole 4, which is formed in one end wall 3 of the casing 1, and by bolts 6 which extend through a cover plate 5 fixed on the outer side of that end wall 3 and onto one end of the vane shaft 2.

In the casing 1 there is arranged a cylindrical rotor 7 which encloses the vane shaft 2. One annular end wall 8 of the rotor 7 is rotatably borne by means of a bearing 9 on the boss 10 of the end wall 3 of the casing 1. A drive journal 12 protruding from the other end wall 11 of the rotor 7 is borne by a bearing 13 in the other annular end wall 14 of the casing 1. The drive journal 12 is connected through a not-shown transmission to an engine so that it can rotate the rotor 7 in the direction of arrow a of FIG. 2.

The rotor 7 has its rotational center line made eccentric by a distance E from the center line of the casing 1 so that its outer circumference is partially in sliding contact with a land 15 of the inner circumference of the casing 1 at all times. The other end portion 16 of the vane shaft 2 is cranked to have its end borne through a bearing 17 in a bearing hole 18 which is formed in the drive journal 12 of the rotor 7.

The circumferential wall of the rotor 7 is formed with three slots 19 which are equidistantly spaced from one another and elongated in parallel with the rotational center line of the rotor 7 and through which are extended first to third vanes 20-1 to 20-3, respectively. The legs of the individual vanes 20-1 to 20-3 are held in first to third holders 21-1 to 21-3, which are rotatably borne on the vane shaft 2 through needle bearings 22-1 to 22-6.

The first and third holders 21-1 and 21-3 are made to have similar shapes and are provided with bifurcated rods 24, which are formed with slots 23, and one pair of cylindrical bearing retainers 25-1 and 25-2, and 25-5 and 25-6 which are formed to project from the one-end and intermediate portions thereof. The legs of the first and third vanes 20-1 and 20-3 are fitted in and fastened to the slots 23 of the two holders 21-1 and 21-3 by means of a plurality of rivets 26.

The second holder 21-2 is provided with the similar bifurcated rod 24 and one pair of cylindrical bearing retainers 25-3 and 25-4 which are formed to project from the portions equidistantly spaced from the two ends thereof.

In the respective bearing retainers 25-1 to 25-6 of the first to third holders 21-1 to 21-3, there are retained the aforementioned needle bearings 22-1 to 22-6, each of which has both its ends retained in both the ends of the corresponding one of the bearing retainers 25-1 to 25-6.

The first and third holders 21-1 and 21-3 are borne in a relationship of point symmetry to the vane shaft 2. Between the two bearing retainers 25-1 and 25-2 of the first holder 21-1, more specifically, there is positioned the intermediate bearing retainer 25-6 of the third holder 21-3 adjacent to the intermediate bearing retainer 25-2 of the first holder 21-1. The bearing retainer 25-5 at the end of the third holder 21-3 is positioned at the end portion of the first holder 21-1, where no bearing retainer exists. On the other hand, one bearing retainer 25-3 of the second holder 21-2 is positioned adjacent to the bearing retainer 25-1 at the end portion of the first holder 21-1 and the intermediate bearing retainer 25-6 of the third holder 21-3, and the other bearing retainer 25-4 thereof is positioned adjacent to the intermediate bearing retainer 25-2 of the first holder 21-1 and the bearing retainer 25-5 at the end portion of the third holder 21-3. Thrust bearings 27 are positioned between the adjacent bearing retainers 25-1 to 25-6.

On the bearing retainers 25-1 to 25-6, there are fixed balance weights W1 to W6 which protrude in the directions opposite to the first to third vanes 20-1 to 20-3. The rotational balance of the vanes 20-1 to 20-3 are ensured by those balance weights W1 to W6. The leading ends of the individual vanes 20-1 to 20-3 extend through the slots 19 in the rotor 7 and engage the inner circumference of the casing 1 such that they protrude from the outer circumference of the rotor 7, as the rotor 7 rotates, to slide on the inner circumference of the casing 1 in the circumferential direction.

Figure 3:
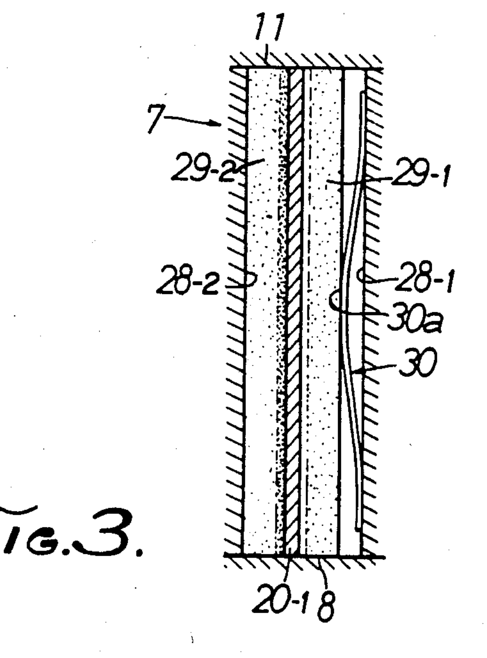
FIG. 3 is a sectional plan view taken substantially on the line III—III in FIG. 2.
Figure 4:
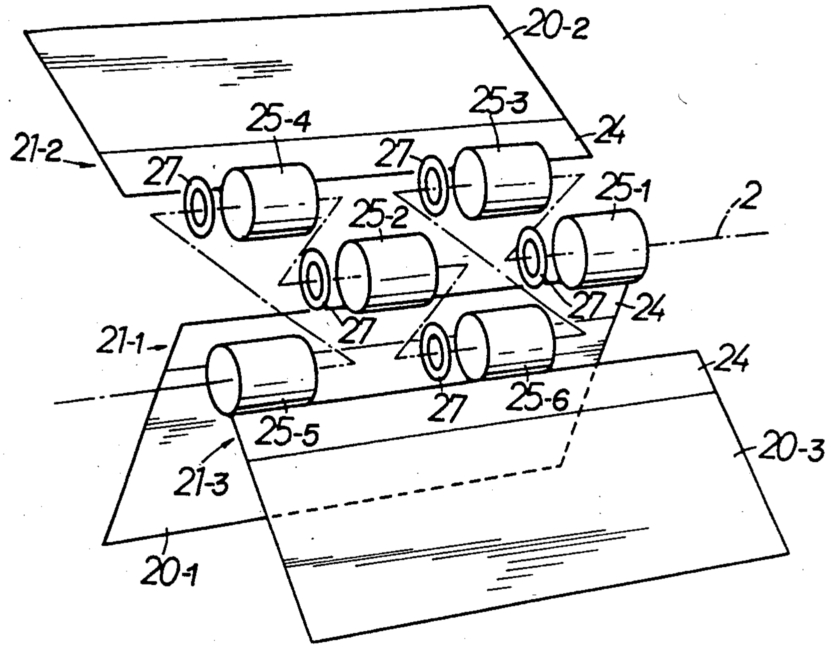
FIG. 4 is a perspective view schematically illustrating the arrangement of the individual vanes relative to the vane shaft.

Each slot 19 is formed in both its inner sides with long grooves 28-1 and 28-2 which have their openings facing each other and which are elongated in the longitudinal direction of the slot 19. Seal elements 29-1 and 29-2 made of carbon are fitted in the long grooves 28-1 and 28-2, respectively. Between the bottom of one long groove 28-1 positioned at the rotationally leading side of the rotor 7 and the seal element 29-1 fitted in the former, there is fitted under compression an angular leaf spring 30 which has a crest 30*a* at its longitudinal center portion, as shown in FIG. 3. The two seal elements 29-1 and 29-2 are forced into contact with both sides of each of the vanes 20-1 to 20-3 by the elastic force of that leaf spring 30. The inner circumference of the casing 1 is formed across the land 15 with the exit 32 of a suction chamber 31 and the entrance 34 of a discharge chamber 33. Indicated at reference numerals 35 and 36 are the entrance of the suction chamber 31 and the exit of the discharge chamber 33, which have communications with the suction port and the discharge port.

Figure 5:
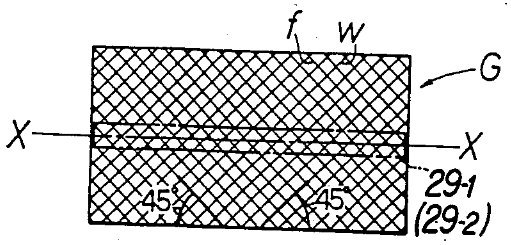
FIG. 5 is a top plan view diagrammatically showing the glass cloth used in the device of the present invention.
Figure 7:
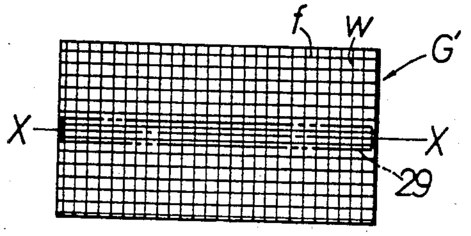
FIG. 7. PRIOR ART
FIG. 7 is a top plan view similar to FIG. 5 but showing the glass cloth used in the prior art vane structure.
Figure 8A:
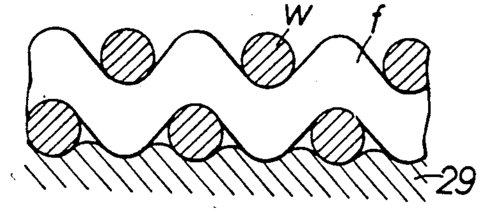
FIG. 8a. PRIOR ART
FIG. 8(*A*) is a highly-enlarged, sectional explanatory view that illustrates the typical wear that occurs in the seal element as a result of the glass cloth of the prior art vane structure.
Figure 8B:
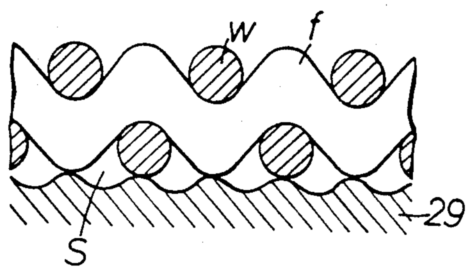
FIG. 8b. PRIOR ART

Each of the vanes 20-1 to 20-3 is prepared by laminating and setting ten to twelve sheets of prepregs of plain weave glass cloth, which are impregnated with a thermosetting phenolic resin, as has been described hereinbefore. As shown in FIG. 5, the warps w and wefts f of the glass cloth G of either the outermost layer or both the outermost and underlying layers are arrayed at an angle of 45 degrees with respect to the longitudinal center line X—X of the seal element 29-1 or 29-2. In the glass cloth of the underlying or mid-layers, the warps w may be arranged in the conventional manner at a right angle with respect to the longitudinal center line X—X of the seal member 29-1 or 29-2, as shown in FIG. 7, whereas the wefts f are arrayed in parallel with the same center line X—X.

Moreover, the weaving density of the glass cloth of either the outermost layer or both the outermost and underlying layers is set at 50 threads/25 mm or higher for both warp and weft to provide a fine surface.

The operations of the embodiment will be explained in the following. When the engine is run to drive the air pump, the rotor 7 is rotated in the direction a of FIG. 2. In accordance with these rotations, the individual vanes 21-1 to 20-3 slide on the inner circumference of the casing 1 with the length projecting from the outer circumference of the rotor 7 being gradually increased during the rotation of 180 degrees from the contacting position of the rotor 7 with the land 15. During the subsequent rotation of 180 degrees, the vanes 20-1 to 20-3 slide on the inner circumference of the casing 1 with their respective lengths projecting from the outer circumference of the rotor 7 being gradually decreased. As a result, the individual vanes 20-1 to 20-3 perform pumping actions in which they are caused to draw air from the exit 32 of the suction chamber 31, to carry the air around the inner circumference of the casing 1, and to discharge the carried air into the entrance 34 of the discharge chamber 33.

Figure 6:
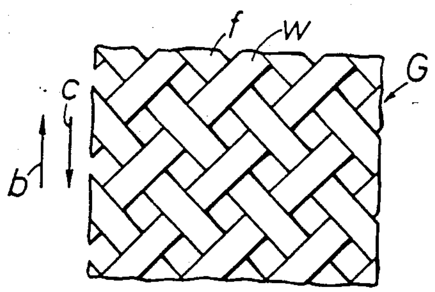
FIG. 6 is an enlarged top plan view of the glass cloth shown in FIG. 5.

As a result, the individual vanes 20-1 to 20-3 are caused to slide on the seal elements 29-1 and 29-2 and, as has been described hereinbefore, the phenolic resin of the vanes 20-1 to 20-3 is worn away by the seal elements 29-1 and 29-2 so that the glass cloth G is exposed on the sliding surfaces of the vanes 20-1 to 20-3. The glass cloth G thus exposed in this case is limited to that of the outer most layer or its underlying layer at both sides of each of the vanes 20-1 to 20-3. Thereafter, the individual seal elements 29-1 and 29-2 are subject to increasing wear by the glass cloth. Despite of this fact, with this invention, however, the glass cloth G has its warps w and wefts f obliquely intersecting to have a fine or smooth seam, as shown in FIG. 6. As a result, if each vane 20-1 or 20-3 reciprocally slides in the directions of arrows b and c in FIG. 6, the intersections of both the threads w and f uniformly rub the whole sliding surfaces of the seal element 29-1 and 29-2 so that the sliding surfaces of the seal element are smoothly worn without any degradation in the surface roughness. Moreover, since the glass cloth has a high weaving density and accordingly a close texture, the wear is reduced further over the prior art low density weave cloth.

If the needle rollers 22*a* of the individual needle bearings 22-1 to 22-6 are inclined in accordance with the rotations of the first to third vanes 20-1 to 20-3 so that thrust loads in a leftward or rightward direction of FIG. 1 are applied from the needle bearings 22-1 to 22-6 to the vanes 20-1 to 20-3, then the thrust loads are borne through the thrust washers 27 on the adjoining bearing retainers 25-1 to 25-6.

Incidentally, it is conceivable that the warps w and wefts f of all the glass cloth G of each of the vanes 20-1 to 20-3 are arrayed at an inclination. However, such arrangment would be disadvantageous over the prior art in strength and thermal expansion characteristics of the vanes and further is not preferred with respect to the yield of the material of the glass cloth. Considering that the glass cloth to be ground by the seal element 29-1 or 29-2 and exposed to the outside normally is limited to that belonging to the outermost layer and the next underlying layer, it is sufficient that the glass cloth having its warps w and wefts f positioned at an angle to the seal elements may be only one or two layers, and the intersecting angle is suitable at about 45 degrees.

Figure 9:
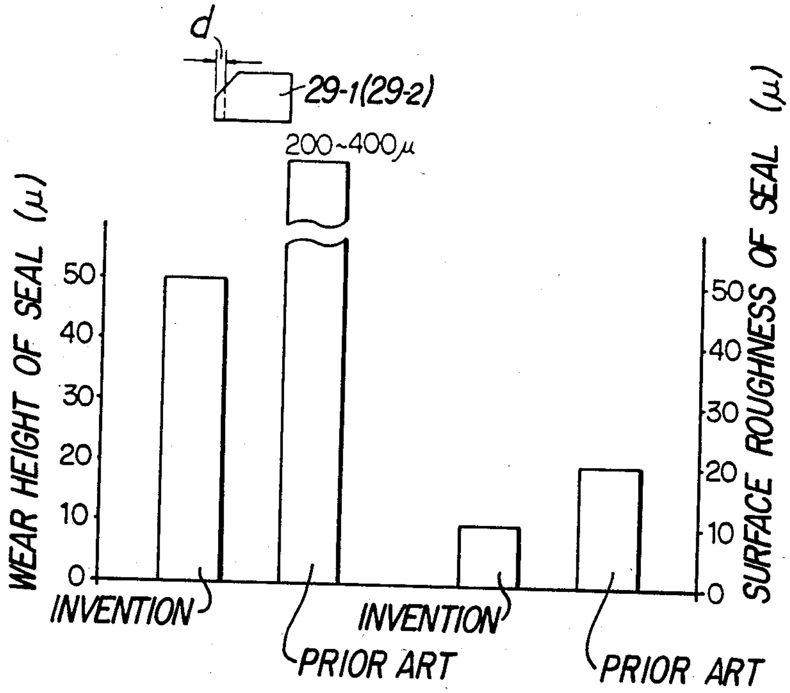
FIG. 9 is a graph illustrating comparisons in the wear height and surface roughness between vanes according to the present invention and the prior art vanes.
Figure 10:
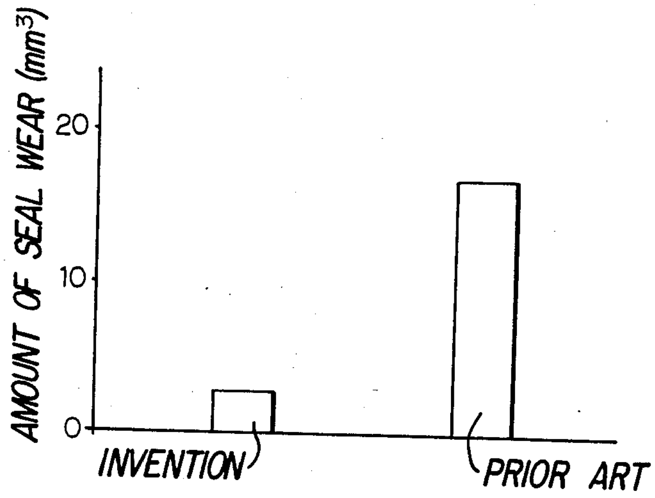
FIG. 10 is a graph illustrating a comparison in the wear of the sealing elements between vanes according to the present invention and the prior art vanes.

FIG. 9 is a graph showing the comparisons in the wear height and the surface roughness of the seal elements between vanes constructed according to this invention and the conventional prior art vanes after durability tests of the air pump for 50 hours. It is apparent from FIG. 9 that the vane structure of the present device is excellent. Incidentally, the wear height means the worn length d in FIG. 9 of the leading end of each sealing element 29-1 or 29-2. FIG. 10 is a graph showing the comparison of the test results between the prior art vanes and vanes according to the present invention with like sealing elements incorporated into a slide tester which shows the wear of the sealing elements can be remarkably reduced by means of the vanes of the present invention. The conditions of the slide tests were: a speed of 5.6 m/sec; a pressure of 10 kg/$cm^2$; a contact area of 2 $cm^2$; and a test period of 1 hour.

As has been described hereinbefore, according to the present device, the glass cloth in at least the outermost layer has its warps and wefts arrayed at an inclination so that the sliding surfaces of the seal elements can be smoothly worn, whereby excellent sealing characteristics between the vanes and the seal elements can be maintained while maintaining the pumping efficiency, and further the magnitude of wear minimized by employing glass cloth with a high density weave.

The invention claimed is:

1. A vane for a vane type pump including elongated sealing elements having a length for engaging the sides of the vane, comprising, multiple layers of cloth laminated and bound together by a synthetic material, and at least the outermost layer of cloth on both sides of the vane having its threads positioned at an acute angle of substantially 45° to the length of the elongated sealing elements.

2. A vane for a vane type pump including elongated sealing elements having a length for engaging the sides of the vane, comprising, multiple layers of cloth laminated and bound together by a synthetic material, and at least the outermost layer of cloth on both sides of the vane being woven and having its warp and weft threads positioned at an angle of substantially 45° to said length of the elongated sealing elements.

3. The vane of claim 2 wherein at least the next layer of cloth underlying each said outermost layer also has its threads positioned at an angle to the length of the elongated sealing elements.

4. The vane of claim 2 wherein the cloth layers are pre-impregnated glass cloth with a thermosetting phenolic resin as the said synthetic material.

5. The vane of claim 2 wherein a plurality of said multiple layers of cloth are woven and have the warp and weft positioned substantially parallel and perpendicular, respectively, to the length of said sealing elements.

6. The vane of claim 2 wherein said outermost layer of cloth is a plain weave glass cloth having a weaving density of at least 50 threads per 25 mm. for both the warp and weft.

7. In a vane type air pump constructed of a cylindrical casing and a cylindrical rotor which has its rotational center line positioned eccentric to the center line of said casing such that vanes extend through slots formed in the circumferential wall of the rotor in parallel with the rotational center line, and the vanes having their leading ends engaging the inner circumference of the casing in a manner to slide in the circumferential direction, and with both inner sides of the slots having rod-shaped seal elements which extend in the longitudinal directions of said slots and are forced into contact with both sides of said vanes, the vanes being constructed of a laminate of a multiplicity of layers of plain weave glass cloth pre-impregnated with a thermoset synthetic resin, the improvement comprising a vane structure having at least the outermost layer of glass cloth on each side positioned with the warp and weft at an inclination to said longitudinal direction in which the seal elements extend.

8. The improved vane of claim 7 wherein the said outermost layer of glass cloth has its warp and weft positioned at an angle of inclination of substantially 45° to the said longitudinal direction of said seal elements and a weaving density of at least 50 threads per 25 mm.

* * * * *